United States Patent [19]
Bailey

[11] 3,718,852
[45] Feb. 27, 1973

[54] PHASE ANGLE REGULATOR FOR HIGH FREQUENCY INVERTER

[75] Inventor: Ronald B. Bailey, Kennett Square, Pa.

[73] Assignee: General Electric Company

[22] Filed: July 14, 1971

[21] Appl. No.: 162,430

[52] U.S. Cl. ............... 321/19, 219/10.77, 323/20, 323/102, 323/119
[51] Int. Cl. .................................... H02m 7/52
[58] Field of Search ........ 219/10.77; 321/19; 323/20, 323/22 SC, 31, 32, 102, 108, 119

[56] References Cited

UNITED STATES PATENTS

| 2,945,112 | 7/1960 | Scott | 219/10.77 |
| 3,549,979 | 12/1970 | Stearns et al. | 321/19 |
| 2,498,760 | 2/1950 | Kreithen | 219/10.77 X |
| 3,391,329 | 7/1968 | Meyer | 219/10.77 X |
| 3,560,836 | 2/1971 | Lezan | 219/10.77 X |

Primary Examiner—A. D. Pellinen
Attorney—J. Wesley Haubner et al.

[57] ABSTRACT

In a static inverter, phase angle error detection circuitry is used to control the operating frequency of the inverter as a function of the phase displacement between the alternating current supplied to a tank load and the alternating voltage across that load, thereby regulating the power factor of the load circuit.

5 Claims, 2 Drawing Figures

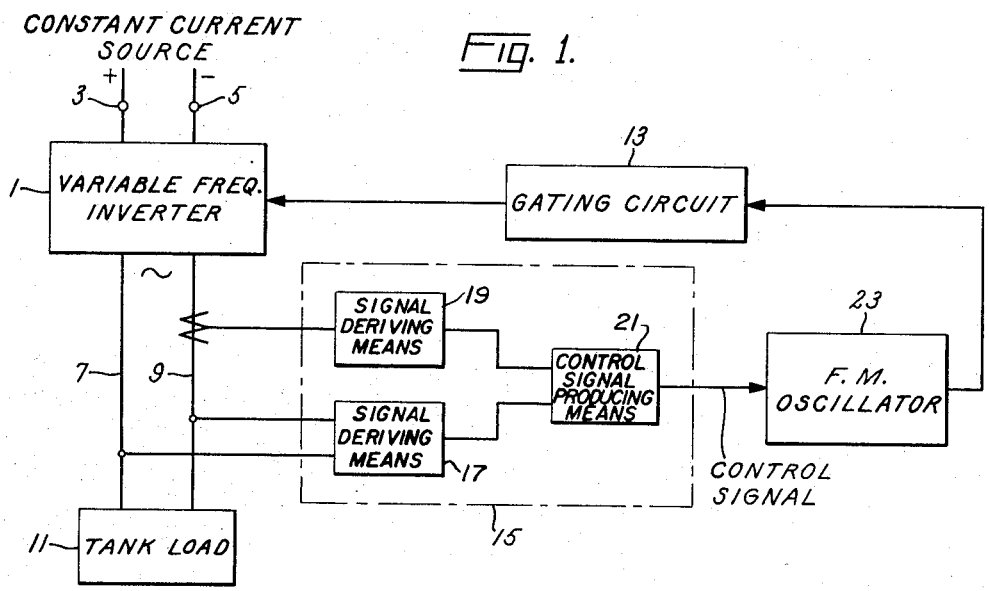
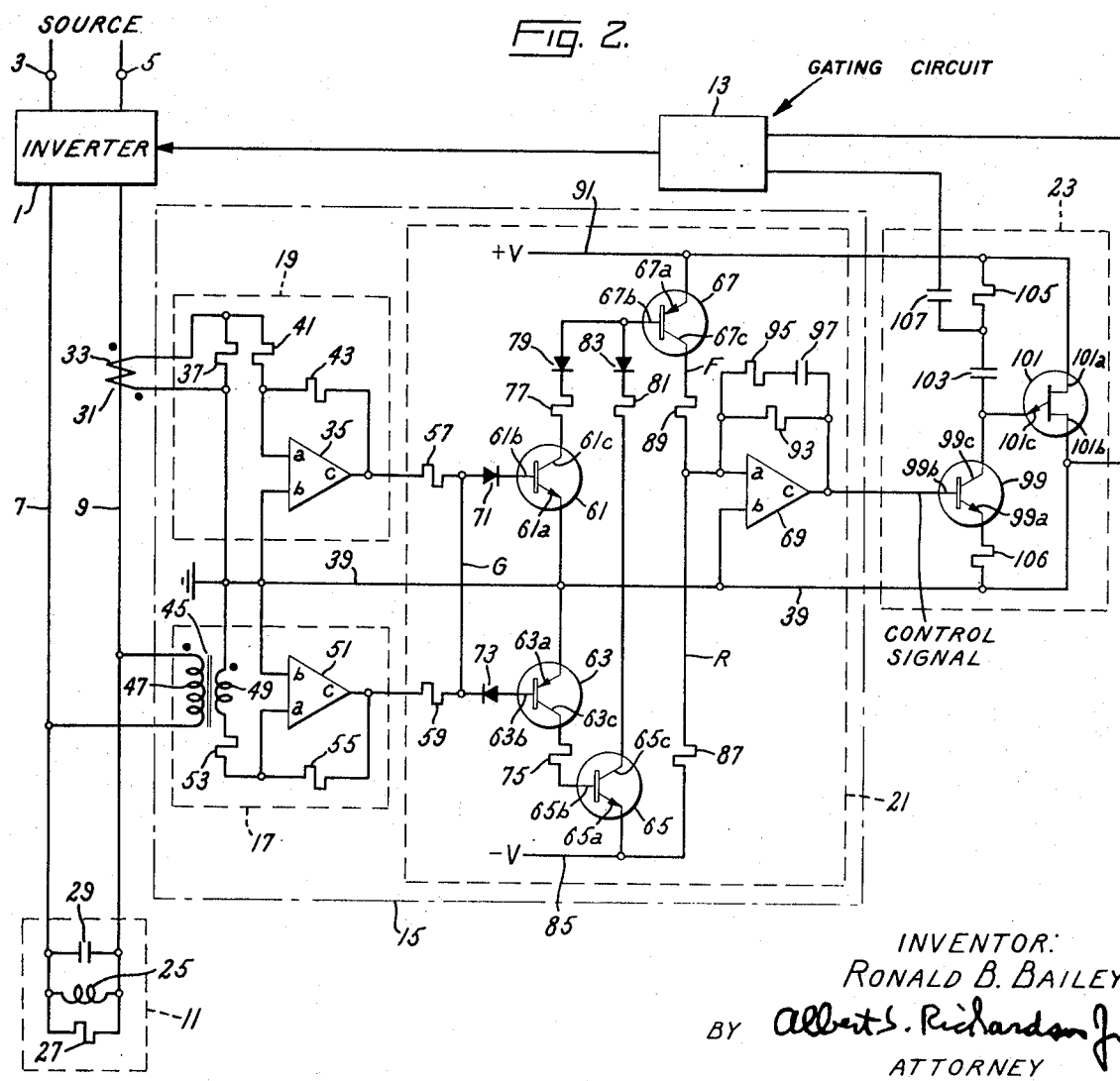
INVENTOR:
RONALD B. BAILEY,
BY Albert S. Richardson Jr.
ATTORNEY

PHASE ANGLE REGULATOR FOR HIGH FREQUENCY INVERTER

BACKGROUND OF THE INVENTION

The present invention relates to electric power apparatus useful for supplying high-frequency alternating current to "tank loads," and more particularly it relates to such apparatus characterized by widely variable frequency and relatively constant voltage gain.

A "tank load" as used herein refers to a load circuit comprising the combination of resistance (R), inductance (L), and capacitance (C). One example is the parallel-tuned circuit formed by connecting a bank of capacitors across an induction heating coil. Although the coil itself is highly inductive, the load circuit will nevertheless exhibit nearly unity power factor as a result of suitably dimensioning the parallel capacitance. Such tank loads and their high-frequency a-c power supplies are well known in the induction heating art.

With the commercial development of high-power solid-state controlled rectifiers (often referred to as SCR's or thyristors), there has been a growing interest in designing reliable and efficient static conversion apparatus employing such components for the purpose of supplying high-frequency alternating current in industrial heating applications. The basic concept is to use a power inverter in tandem with a power rectifier. The rectifier converts readily available three-phase alternating current at fixed, main frequency (e.g., 60 Hertz) into unidirectional current, and the inverter then changes the direct current into single-phase alternating current of controllable, high frequency (e.g., 100–4000 Hz). In one advantageous form, such apparatus employs a parallel-compensated inverter in conjunction with a constant current source. Parallel-compensated inverters belong to the family of load commutated inverters and are well known to persons skilled in the art, as evidenced by prior art U.S. Pat. Nos. 2,009,788—Sabbah and 2,652,528—Demontvignier. When the respective load-current carrying thyristors of the inverter are cyclically triggered in a predetermined sequence and at a desired rate, the direction of current that is fed to the load circuit will alternate at a frequency determined by the triggering rate. With a square wave of current being thus switched into the tank load, an alternating voltage of sinusoidal waveform is developed thereacross.

In order for each thyristor in turn to turn off at the end of each of its natural conducting periods, it needs to be subjected to a reverse voltage following conduction for an interval at least as long as the characteristic turn off time of the device. In load commutated inverters, this requires that the switching action occur in advance of the zero-crossing of load voltage by an electrical angle whose time duration, at maximum operating frequency, is longer than the aforesaid turn-off time. Toward that end, the load circuit should be tuned to have a leading power factor characteristic.

Various schemes have heretofore been published and/or used for controlling and regulating the operation of such high-frequency induction heating inverters. See, by way of example, U.S. Pat. Nos. 3,448,368—Brouwer and 3,566,243—Landis. A generally recognized problem in this art is that, due to variations in load impedance, neither the power factor angle nor the tuned frequency of the load is constant. The load impedance imposed on the inverter can vary for a variety of reasons. For example, the inverter may be designed to accommodate alternative heating coils having different load characteristics, or a given coil may be used to heat different work pieces whose individual characteristics vary. In addition, the load impedance is likely to vary in magnitude and phase as the temperature of the work piece increases and decreases during each heating cycle. It is therefore a general objective of persons working in this art to provide means for controlling the inverter in a manner that will minimize any adverse influence on both commutation and efficiency resulting from such load variations. Thus, for example, in an inverter arranged to supply an induction heater with high-frequency alternating voltage of fixed amplitude (see the above-cited U.S. Pat. No. 3,448,368), it has heretofore been proposed to respond to changes in the tuned frequency of the load by varying the operating frequency of the inverter while preserving a substantially constant firing angle with respect to the zero-crossing of the load voltage.

SUMMARY OF THE INVENTION

The objective of my invention is to provide, for use in conjunction with electric power conversion apparatus which is designed to supply high-frequency alternating current to a tank load, improved means for varying the frequency of the apparatus in a manner that enables it to operate over a wide range of frequency with substantially constant voltage gain.

Briefly stated, in accordance with one aspect of the invention, the conversion apparatus includes a constant current source of electric power and a static inverter whose main switching elements comprise periodically conducting thyristors which are cyclically triggered at a rate determined by the operating frequency of associated gating means. The gating means is responsive to a control signal of variable magnitude, and its frequency varies as a function of that magnitude. The control signal is derived from the difference between a feedback signal, which is representative of the actual phase displacement between the alternating current which the inverter supplies to the tank load and the alternating voltage across the load, and a reference signal representative of the desired phase displacement therebetween, and the gating means responds to the control signal by varying the frequency of the alternating current as appropriate to keep the actual phase displacement approximately equal to the desired phase displacement. In this manner the power factor angle (i.e., the phase angle between load current and voltage) is maintained substantially constant despite variations in the tuned frequency (i.e., the parallel resonant frequency) of the load due to fluctuations or changes of the load impedance. Consequently, the inverter will operate with substantially constant voltage gain. This means that the power delivered to the load or the amplitude of the load voltage can be conveniently and efficiently controlled by means of a phase-controlled power rectifier connected between the power source and the input of the inverter, and the power factor of the 60-hertz source can be optimized over a wide range of reactive load changes.

BRIEF DESCRIPTION OF THE DRAWINGS

While the specification concludes with claims particularly pointing out and distinctly claiming the subject matter that I regard as my invention, the invention will be better understood from the following description taken in conjunction with the accompanying drawing in which:

FIG. 1 is a functional block diagram of power conversion apparatus embodying the present invention in its preferred form; and FIG. 2 is a schematic diagram of certain circuits represented by blocks in FIG. 1.

DETAILED DESCRIPTION OF THE PREFERRED EMBODIMENT

Referring to FIG. 1, induction heating apparatus is shown utilizing a variable frequency inverter 1 having a pair of d-c input terminals 3 and 5 and a pair of a-c output or load circuit conductors 7 and 9. The input terminals 3, 5 of the inverter 1 are adapted to be connected to a suitable source of constant direct current which may comprise, for example, a current smoothing inductor or choke fed by a phase-controlled power rectifier of conventional design. The inverter 1 converts this constant current into variable frequency alternating current which is supplied via the output conductors 7 and 9 to a tank load 11. While any suitable inverter can be used for this purpose, the parallel-compensated inverter that was mentioned hereinbefore has proven to be particularly advantageous. As is well known to persons skilled in the art, such an inverter is formed by appropriately interconnecting and cyclically triggering in a prescribed sequence a plurality of main switching elements which comprise periodically conducting controlled rectifiers. The referenced inverter is disclosed in more detail in my copending patent application Ser. No. 274,895, filed July 25, 1972 assigned to the General Electric Company. The frequency of its alternating current output will depend on the triggering rate of the controlled rectifiers, and this in turn is determined by the operating frequency of associated gating means comprising a gating circuit 13 and a frequency modulated oscillator 23.

The oscillator 23 puts out a train of short pulses to activate the gating circuit 13 which comprises suitable means, such as a flip-flop, for forming trigger signals and distributing them to the proper controlled rectifiers in the inverter 1. Thus the output frequency of the inverter is one-half that of the oscillator 23. Preferably the voltage applied to the tank load 11 is controlled by means of a phase-controlled rectifier bridge comprising the constant current source, the firing angle of the rectifier bridge being controlled by a conventional closed-loop regulator (not shown).

The tank load 11 ordinarily comprises an induction heating coil paralleled by a capacitor bank which is tuned so that the load circuit has a high Q (i.e., greater than 1.5) and a leading power factor characteristic during normal load impedance and fundamental frequency conditions. Thus under these normal conditions the alternating current that the apparatus supplies to the load will lead the alternating voltage across the load by a predetermined phase angle. For reasons already explained, the impedance of the tank load is likely to vary, and consequently the actual phase angle between load current and voltage tends to deviate from the predetermined desired value. In order to preserve a substantially constant phase angle, I have provided a novel regulator 15 which controls the operating frequency of the oscillator 23 by supplying it with a control signal whose magnitude reflects the difference or error between the actual and the desired phase angles. Responding to this control signal, the oscillator 23 will vary its frequency and hence the frequency of the load current as a function of the control signal magnitude, whereby the alternating current supplied to the load has whatever frequency is appropriate to ensure that it leads voltage by approximately the desired phase angle. For example, if the actual phase angle were to increase abnormally, the magnitude of the control signal supplied by the regulator 15 will change in a sense that causes the oscillator 23 to decelerate, and the frequency of the alternating current is eventually lowered to a level at which the actual phase angle is again approximately equal to the desired phase angle.

As is shown in FIG. 1, the phase angle regulator 15 comprises means 17 connected across the output conductors 7 and 9 of the inverter for deriving a signal representative of load voltage, means 19 coupled to one of the output conductors for deriving a signal representative of the alternating current that is supplied to the load, and means 21 connected to both of the means 17 and 19 for developing a feedback signal representative of the actual phase displacement between current and voltage and for comparing the feedback signal with a reference signal representative of a desired phase displacement. The means 21 is arranged to supply the aforesaid control signal whose magnitude reflects the difference between the actual and the desired phase displacements, and this control signal is fed to the frequency modulated oscillator 23 which responds thereto by controlling the frequency of the load current as appropriate to keep the actual phase displacement approximately equal to the desired phase displacement.

Referring now to FIG. 2, it will be seen that the tank load 11 includes an induction heating coil 25 shunted by a capacitor 29. In operation, a workpiece is placed in the magnetic field of the coil 25 where it is heated by the eddy currents induced therein. The effective resistance of the load is conventionally illustrated as a parallel resistor 27. As was previously mentioned, the tank load is tuned so that when the inverter 1 is running at a frequency within its normal range and under typical operating conditions, it exhibits a leading power factor characteristic, i.e., the alternating current supplied to the load leads the alternating voltage across the load by a predetermined desired phase angle. In normal operation, however, the actual phase displacement between current and voltage will vary as the load impedance varies. This tendency is compensated for or counteracted by my phase angle regulator 15 which responds to such variations by varying the frequency of the inverter in a corrective sense so that the actual phase angle is kept approximately equal to the desired phase angle.

The phase angle regulator 15 includes means 19 for sensing the load current and deriving a signal representative thereof. As it is shown in detail in FIG. 2, this means comprises a transformer 31, which has a coil 33 coupled to output conductor 9 to sense the current supplied to the tank load 11, and a first operational amplifier 35, which is provided with inputs 35a and 35b and output 35c. A resistor 37 is connected across the current sensing coil 33, and one of their common connections is connected to a ground or reference potential 39. A resistor 41 is connected from one terminal of the current sensing coil to the inverting input 35a of operational amplifier 35. A resistor 43 is connected between the output 35c and the inverting input 35a of operational amplifier 35, and input 35b is connected to the ground or reference potential.

In FIG. 2 the means 17 for sensing the load voltage and deriving a signal representative thereof comprises an isolation transformer 45 which has a primary coil 47 connected between conductors 7 and 9 and a secondary coil 49. Means 17 further includes a second operational amplifier 51, which is provided with inputs 51a and 51b and an output 51c. The secondary coil 49 has one terminal connected through resistor 53 to the inverting input 51a of operational amplifier 51 and has its other terminal connected to the ground or reference potential. Input terminal 51b is also connected to the ground or reference potential 39. A resistor 55 is connected from the output 51c to the input 51a of operational amplifier 51.

The current-derived output signal from the operational amplifier 35 is supplied, via a resistor 57, to a summing point G in the feedback signal developing means 21. The voltage-derived output signal of the operational amplifier 51 is supplied, via resistor 59, to the same point G. As can be seen in FIG. 2, there are two parallel paths between the summing point G and the reference or ground potential 39. One path comprises a diode 71 in series with the base-emitter junction of a first transistor 61, and this transistor is biased on when the net potential on the summing point G is positive with respect to the reference potential 39. The second path comprises a diode 73 in series with the emitter-base junction of another transistor 63 which is biased on when the net potential of point G is relatively negative. In effect the operational amplifiers 35 and 51 energize the summing point G with two output square waves which are equal to each other in amplitude but displaced in phase so that each half cycle they overlap or correspond in polarity for an interval which, if measured in electrical degrees, is equal to the angle by which load current leads load voltage. These outputs, which are in synchronism with the current and voltage supplied to the load, are algebraically added at the summing point G to provide a resultant signal whose magnitude is fixed but whose time duration, expressed in electrical degrees, varies with the phase displacement between the load current and the load voltage. The resultant signal recurs twice a cycle with alternating polarity. During its positive half cycles, only the first transistor 61 is turned on, and during its negative half cycles only the second transistor 63 is turned on.

The collector 63c of the second transistor 63 is connected through a resistor 75 to the base 65b of a third transistor 65 whose emitter 65a is connected to a relatively negative bus 85 of a suitable source of d-c control power. The collector 65c of the transistor 65 is connected through a resistor 81 and a diode 83 to the base 67b of a fourth transistor 67. The collector 61c of the first transistor 61 is also connected to the base 67b, via a resistor 77 and a diode 79. The emitter 67a of transistor 67 is connected directly to a positive bus 91 of the d-c control power source. The collector 67c of this transistor is connected through a resistor 89 to the inverting input 69a of an operational amplifier 69 whose other input 69b is connected to the ground or reference potential 39.

It will be observed in FIG. 2 that the transistor 67 is in a conducting state whenever either the transistor 61 or the transistor 63 (and 65) is biased on. So long as the transistor 67 is conducting, a positive voltage of predetermined constant magnitude is applied to the resistor 89. This voltage, labeled F in FIG. 2, is the above-mentioned feedback signal, and it actually comprises a train of discrete signals which recur at twice the frequency of the load current and which individually have a duration corresponding to the electrical degrees by which the load current leads the load voltage. Consequently, the ratio of the cumulative duration of the feedback signals F per cycle of alternating current to the period of the same cycle is a fraction which varies with the amount of the actual phase displacement between load current and voltage.

During the intervals or gaps between the discrete signals comprising the feedback signal F, the inverting input 69a of the operational amplifier 69 is maintained at a relatively negative voltage by means of a resistor 87 which is connected between it and the negative bus 85 of the control power source. This negative bias is the previously mentioned reference signal, and it is noted in FIG. 2 by the letter R. It has a predetermined constant magnitude which is determined by the resistance ratio of the resistor 87 and a resistor 93 connected between the input 69a and the output 69c of the op amp 69. The resistors 87, 89, and 93 are selected so that, whenever the actual phase displacement between the alternating current supplied to the load and the load voltage is approximately equal to the desired phase displacement, the ratio of the magnitude of the feedback signal F to the magnitude of the reference signal R is substantially the reciprocal of the ratio of the degrees of actual phase displacement to 180°. Under steady state conditions when the actual phase displacement is approximately equal to the desired phase displacement, the average magnitude of the difference or error between the feedback and reference signals will be very small and is negative with respect to ground. This difference is averaged, amplified, and inverted by the operational amplifier 69 which consequently produces a relatively small positive output signal.

The operational amplifier 69 has a fixed high gain, and it is given a predetermined time constant by connecting between its input 69a and output 69c a resistor 95 in series with a capacitor 97. The time constant is selected to be at least three and preferably five to ten times longer than the period of the alternating current supplied to the load. Consequently the operational amplifier 69 supplies an output signal proportional to the average magnitude of the difference between the feedback signal F and the continuous reference signal R which energize it, and there is a delayed change in the magnitude of the output in response to rapid changes in the feedback signal.

The output of the operational amplifier 69 comprises the previously mentioned control signal of variable magnitude. This control signal is supplied to the frequency modulated oscillator 23 which, as can be seen in FIG. 2, includes a transistor 99, which has an emitter 99a, a base 99b, and a collector 99c, and a complementary unijunction transistor 101, which has first and second bases 101a and 101b and an emitter 101c. The collector 99c of the transistor 99 is connected through capacitor 103 and resistor 105 to the positive bus 91 of the control power source, while the emitter 99a is connected through resistor 107 to the ground or reference potential 39. The base 99b of transistor 99 is connected to the output 69c of the op amp 69, and thus the conductivity of the transistor 99 will depend on the magnitude of the control signal. The first and second bases 101a and 101b of the unijunction transistor 101 are connected between the positive d-c control power bus 91 and ground, while the emitter 101c is connected to the collector 99c of the transistor 99. As so connected, the unijunction transistor 101 operates as a free running oscillator whose frequency varies with the charging current of the capacitor 103 which in turn depends on the conductivity of the voltage controlled transistor 99. Whenever the magnitude of the control signal is sufficiently high to bias the transistor 99 fully on (saturated), the capacitor 103 is charged most rapidly to the firing point of the unijunction transistor 101, and consequently the unijunction transistor is now periodically fired at its maximum frequency. Each time the unijunction transistor fires, the capacitor 103 is abruptly discharged through resistor 105, and a positive-going pulse of voltage is coupled via a capacitor 107 to the gating circuit 13 which is activated thereby. The maximum frequency of the oscillator 23 is preset at a desired magnitude by appropriately selecting the resistors 105 and 106. As the control signal decreases from its saturating level, the conductivity of the transistor 99 correspondingly decreases, thereby reducing the charging current for capacitor 103 and consequently lowering the operating frequency of the oscillator 23.

In operation, so long as the alternating current which the inverter 1 is supplying to the tank load 11 leads the load voltage by the desired phase angle, the phase angle regulator 15 produces a control signal of appropriately small magnitude to cause the oscillator 23 to operate at a less-than-maximum frequency which is just right to keep the inverter running at the correct frequency to maintain the desired angle under the load conditions then obtaining. However, due to fluctuations of the load impedance, the actual angle of lead is likely to vary from the desired angle, in which event the regulator 15 responds by varying the magnitude of the control signal supplied to the oscillator 23 in a corrective sense.

To illustrate this corrective action, it will be assumed that the load current has advanced in phase with the respect to the load voltage and therefore is more leading than desired. This extends or lengthens the recurrent intervals of polarity correspondence between the current-derived output signal 35c of the operational amplifier 35 and the voltage-derived output signal 51c of the operational amplifier 51. Consequently the transistor 61 will be biased on for a larger fraction of each positive half cycle of load current and the transistor 65 will be biased on for a similarly greater fraction of each negative half cycle, and the individual durations of the constant-magnitude signals forming the feedback signal train F are correspondingly increased. As a result, the average magnitude of the feedback signal increases, and the average difference between the feedback signal F and the reference signal R decreases. In delayed response to this reduction in the average magnitude of the relatively negative difference or error, the operational amplifier 69 begins to reduce the level of the relatively positive control signal that it supplies to the base of the transistor 99 in the oscillator 23. As a result, the transistor 99 conducts less current, and the operating frequency of the oscillator 23 is correspondingly lowered. This lowers the rate at which the gating circuit 13 triggers the controlled rectifiers in the static inverter 1, and the frequency of the alternating current supplied to the tank load is proportionately reduced. Lowering the frequency of the load current has the effect of decreasing the angle of lead, and this in turn is reflected by a decrease in the average magnitude of the feedback signal F. As the average magnitude of the feedback signal F approaches the magnitude of the reference signal R, the control signal supplied by the regulator 15 reaches a level that establishes the appropriate frequency to keep the actual phase angle approximately equal to the desired phase angle for the particular load conditions then obtaining.

At the start of a heating cycle, when the tank load 11 is initially excited by alternating current from the inverter 1, the phase angle regulator 15 will produce a control signal of maximum magnitude. This is because the feedback signal F is zero until load current begins flowing in the output conductors 7, 9 of the inverter, and so long as the average magnitude of the feedback signal is zero the operation amplifier 69 is driven to its saturated state by the continuous, relatively negative reference signal R. As a result of the initially maximum control signal, the oscillator 23 operates at its maximum frequency and the inverter will start supplying load current at maximum frequency. This relatively high frequency causes the load current to lead load voltage by more than the desired phase angle, and consequently the regulator 15 initiates a corrective action by progressively reducing the magnitude of the control signal and hence lowering the frequency of the oscillator until the inverter is running at the frequency which yields the proper phase angle for the load conditions then obtaining.

Thus it can be seen that the present invention is sensitive to the actual phase displacement between alternating current supplied to a tank load and alternating voltage across that load and controls the apparatus which is supplying the load current so as to vary its frequency in a manner that keeps the load current leading the load voltage by a substantially constant predetermined desired angle. In effect my invention is a power factor regulator. So long as the parameters of the high-frequency induction heating inverter previously described are selected so that the commutating interval is only a small fraction of a half-period of the maximum frequency, it can be shown that the peak magnitude of output voltage is substantially directly related to the magnitude of the d-c input voltage by a proportionality factor which is equal to the cosine of the power factor angle. By maintaining the power factor substantially constant, the inverter is allowed to operate with a nearly constant voltage gain. As a result, the apparatus utilizes fully and simultaneously both the voltage and the current ratings for which it is designed, thereby optimizing the power ratings of the input system and of the switching components in the apparatus and improving the overall operating efficiency. Such apparatus can deliver rated power to the load over a relatively wide frequency range (e.g., 65 to 100 per cent of nameplate frequency). In addition, the application of the apparatus to an industrial heating installation is significantly simplified.

While the invention has been described with particular reference to the embodiment shown in the drawings, it will be understood that further modification may be made without departing from the true spirit and scope thereof. For example, instead of being constant, the desired phase angle itself could be changed or programmed by suitably replacing the resistors 87 and 89 with rheostats which are provided with a suitably actuated ganged adjustor. I therefore intend by the appended claims to cover all such modifications as fall within the true spirit and scope of my invention.

What I claim as new and desire to secure by Letters Patent of the United States is:

1. In a static inverter adapted to supply alternating current to a tank load, said inverting including means responsive to a control signal of variable magnitude for varying the frequency of said alternating current as a function thereof, improved means for supplying said control signal comprising:
   a. first means coupled to said inverter for sensing the actual phase displacement between said alternating current and the alternating voltage across the load and for developing a feedback signal representative thereof;
   b. second means for providing a reference signal representative of a desired phase displacement between said alternating current and voltage;
   c. third means energized by said feedback and reference signals for deriving said control signal therefrom, said third means being so arranged that the magnitude of said control reflects the difference between said actual and desired phase displacements, said third means including means for delaying changes in the magnitude of said control signal in response to any rapid change in said feedback signal; and
   d. means for supplying said control signal to the frequency-varying means of said inverter which responds thereto by controlling the frequency of said alternating current as appropriate to keep said actual phase displacement approximately equal to said desired phase displacement.

2. The subject matter of claim 1 in which said tank load comprises a parallel RLC circuit which is tuned to have a leading power factor characteristic during normal load impedance and fundamental frequency conditions, and said control signal tends to cause said frequency-varying means to lower the frequency of said alternating current in response to an abnormal increase in the phase angle by which current leads voltage.

3. In a static inverter adapted to supply alternating current to a tank load, said inverter including means responsive to a control signal of variable magnitude for varying the frequency of said alternating current as a function thereof, improved means for supplying said control signal comprising:
   a. first means coupled to said inverter for sensing the actual phase displacement between said alternating current and the alternating voltage across the load and for developing a feedback signal representative thereof, said first means being constructed and arranged to develop a feedback signal comprising a train of discrete signals which recur at a frequency proportional to the frequency of said alternating current and which individually have a duration corresponding to the electrical degrees by which said alternating current is phase displaced from said alternating voltage, whereby the ratio of the cumulative duration of said discrete signals per cycle of alternating current to the period of the same cycle is a fraction which varies with the amount of said actual phase displacement;
   b. second means for providing a reference signal representative of a desired phase displacement between said alternating current and voltage;
   c. third means energized by said feedback and reference signals for deriving said control signal therefrom, said third means being so arranged that the magnitude of said control signal reflects the difference between said actual and desired phase displacements; and
   d. means for supplying said control signal to the frequency-varying means of said inverter which responds thereto by controlling the frequency of said alternating current as appropriate to keep said actual phase displacement approximately equal to said desired phase displacement.

4. The subject matter of claim 3 in which the discrete signals of said feedback signal train have a first predetermined constant magnitude, said reference signal is a continuous signal having a second predetermined constant magnitude, said first magnitude being related to said second magnitude by a ratio which is substantially the reciprocal of said fraction whenever said actual phase displacement is approximately equal to said desired phase displacement, and said third means is so constructed and arranged that said control signal is proportional to the average magnitude of the difference between said feedback and reference signals.

5. The subject matter of claim 4 in which said third means comprises a relatively high gain amplifier having a time constant which is at least three times longer than the period of said alternating current, thereby delaying changes in said control signal in response to rapid changes in said feedback signal.

* * * * *